US011990783B2

(12) United States Patent
Fukuhara et al.

(10) Patent No.: US 11,990,783 B2
(45) Date of Patent: May 21, 2024

(54) USER INTERFACE PROVIDING DEVICE, METHOD OF PROVIDING DISCHARGE CAPACITY OF SECONDARY BATTERY SYSTEM, AND METHOD OF PROVIDING CHARGE/DISCHARGE CAPACITY OF SECONDARY BATTERY SYSTEM

(71) Applicant: NGK Insulators, Ltd., Nagoya (JP)

(72) Inventors: Motohiro Fukuhara, Nagoya (JP); Kenta Asano, Kasugai (JP); Fumiya Kosaka, Niwa-Gun (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/658,878

(22) Filed: Apr. 12, 2022

(65) Prior Publication Data
US 2022/0239131 A1    Jul. 28, 2022

Related U.S. Application Data

(63) Continuation of application No. PCT/JP2019/041735, filed on Oct. 24, 2019.

(51) Int. Cl.
*G06F 3/048* (2013.01)
*G06F 3/0484* (2022.01)
*H02J 7/00* (2006.01)

(52) U.S. Cl.
CPC .......... *H02J 7/0048* (2020.01); *G06F 3/0484* (2013.01)

(58) Field of Classification Search
CPC .............................. G06F 3/0484; H02J 7/0048
See application file for complete search history.

(56) References Cited

U.S. PATENT DOCUMENTS

| 7,256,516 B2* | 8/2007 | Buchanan | H01M 10/441 |
| | | | 307/62 |
| 2003/0018427 A1* | 1/2003 | Yokota | G01C 21/367 |
| | | | 701/455 |

(Continued)

FOREIGN PATENT DOCUMENTS

| JP | 2013-169137 A | 8/2013 |
| JP | 2013-176226 A | 9/2013 |

(Continued)

OTHER PUBLICATIONS

Yoshinobu et al., Charge/Discharge Schedule Setting Program, Setting Program, Charge/Discharge Setting Method, and Charge/Discharge Schedule Setting Device, Feb. 2018, Fujitsu LTD, 16 pages.*

(Continued)

*Primary Examiner* — Linh K Pham
(74) *Attorney, Agent, or Firm* — BURR PATENT LAW, PLLC

(57) ABSTRACT

Provided is a scheme of providing a plurality of users other than a main user such as an owner with a discharge capacity which a secondary battery system potentially has. A user interface providing device includes an acquisition part, a receiving part, a determination part, and a generation part. The acquisition part acquires a discharge capacity capable of providing to a whole plurality of users other than a main user in a discharge capacity of a secondary battery system. The receiving part receives a logon of a user included in the plurality of users. The determination part determines a usable discharge capacity for a logged-on user from the discharge capacity capable of providing to the whole plurality of users. The generation part generates information indicating contents of a user interface screen including a (Continued)

screen element indicating the usable discharge capacity for the logged-on user.

7 Claims, 6 Drawing Sheets

(56) References Cited

U.S. PATENT DOCUMENTS

| | | | | |
|---|---|---|---|---|
| 2010/0134067 A1* | 6/2010 | Baxter | ................ | B60L 3/0084 |
| | | | | 320/109 |
| 2013/0154561 A1* | 6/2013 | Gadh | ................ | H02J 7/0019 |
| | | | | 320/109 |
| 2014/0214321 A1* | 7/2014 | Kawamata | ......... | G01C 21/3476 |
| | | | | 340/901 |
| 2015/0255796 A1* | 9/2015 | Kim | ................ | H01M 4/664 |
| | | | | 427/377 |
| 2017/0070089 A1* | 3/2017 | Fukubayashi | ..... | H02J 13/00028 |
| 2019/0204840 A1* | 7/2019 | Park | ................ | G01C 21/3667 |
| 2021/0046843 A1* | 2/2021 | Maeda | ................ | B60L 53/68 |
| 2021/0111452 A1* | 4/2021 | Eun | ................ | H01M 10/06 |
| 2021/0241626 A1* | 8/2021 | Nishimura | ............. | B60L 58/13 |

FOREIGN PATENT DOCUMENTS

| | | | | |
|---|---|---|---|---|
| JP | 2013176226 A | * | 9/2013 | |
| JP | 5379495 B2 | * | 12/2013 | |
| JP | 2015136920 A | * | 7/2015 | |
| JP | 2018-023188 A | | 2/2018 | |
| JP | 2018023188 A | * | 2/2018 | |
| WO | 2015/136920 A1 | | 9/2015 | |

OTHER PUBLICATIONS

International Search Report and Written Opinion (Application No. PCT/JP2019/041735) dated Dec. 10, 2019.

English translation of the International Preliminary Report on Patentability (Chapter I) dated May 5, 2022 (Application No. PCT/JP2019/041735).

* cited by examiner

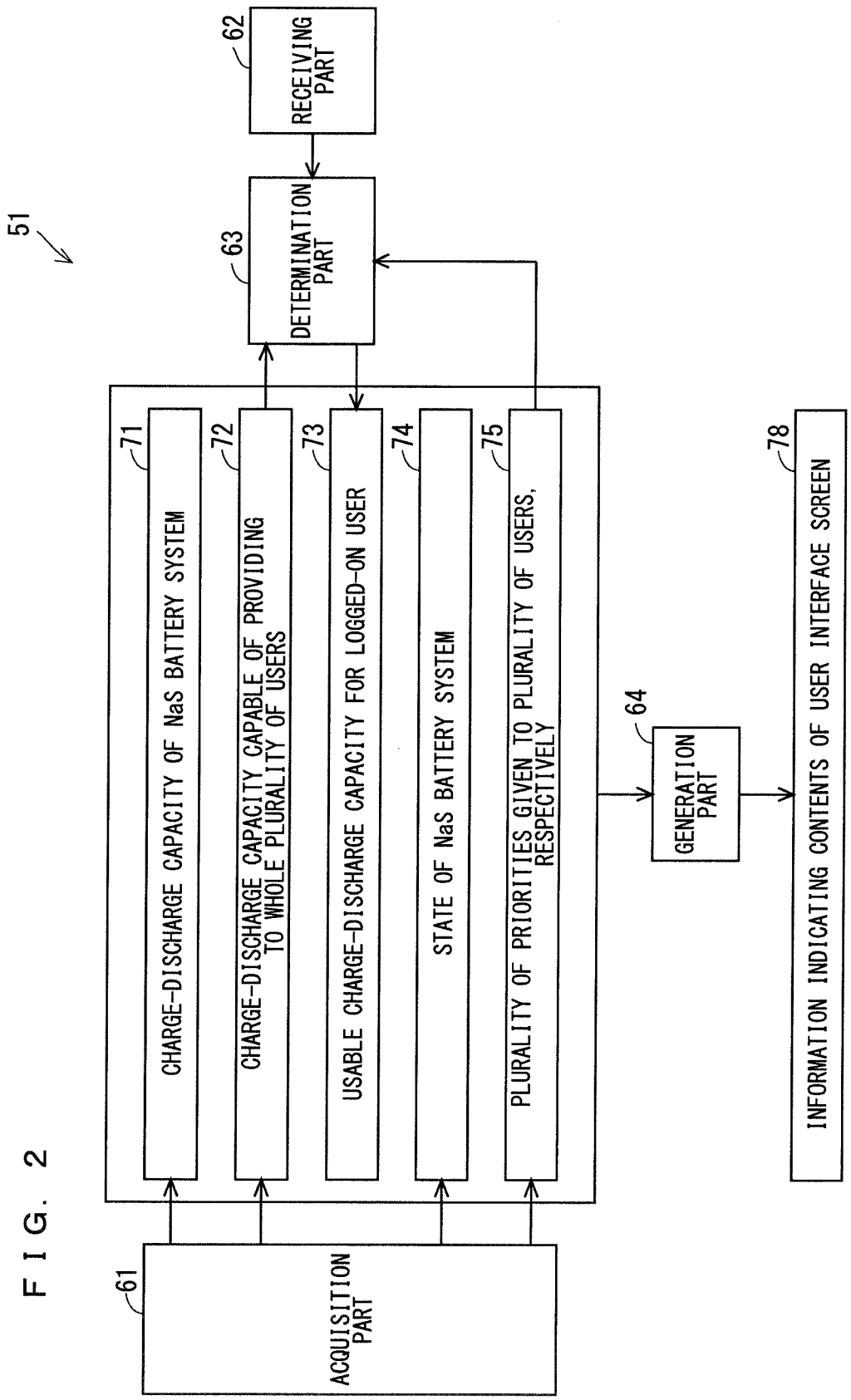
F I G. 2

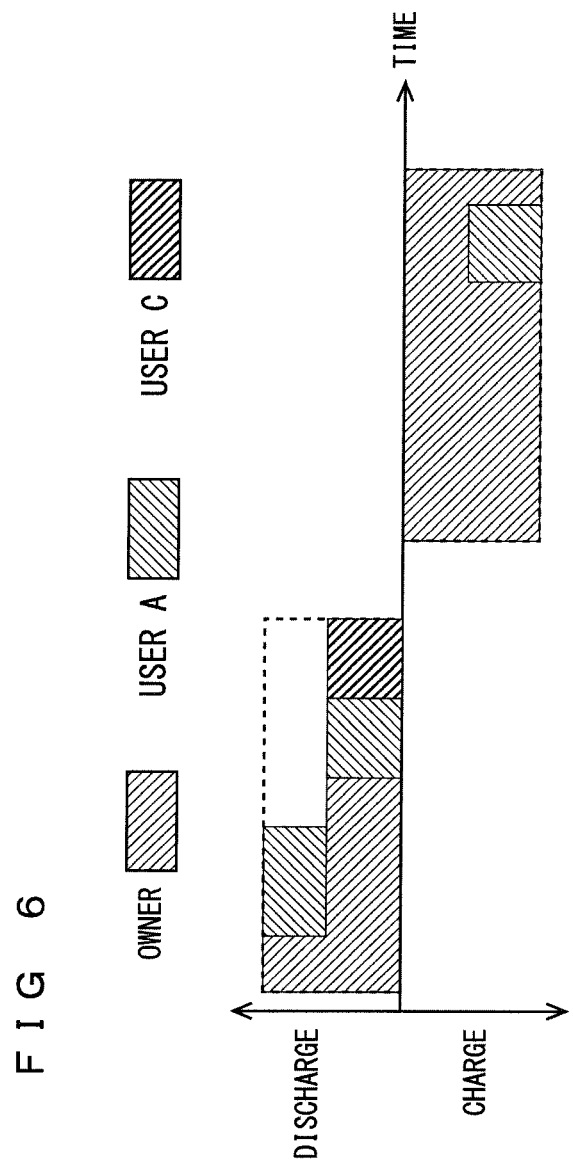

USER INTERFACE PROVIDING DEVICE, METHOD OF PROVIDING DISCHARGE CAPACITY OF SECONDARY BATTERY SYSTEM, AND METHOD OF PROVIDING CHARGE/DISCHARGE CAPACITY OF SECONDARY BATTERY SYSTEM

BACKGROUND OF THE INVENTION

Field of the Invention

The present invention relates to a user interface providing device, a method of providing a discharge capacity of a secondary battery system, and a method of providing a charge-discharge capacity of secondary battery system.

Description of the Background Art

A NaS battery system including a natrium-sulfur (NaS) battery is used by an owner having the NaS battery system. The owner can recognize a state of the NaS battery system with reference to a screen displayed on a terminal provided with the NaS battery system in many cases, and operates the terminal, thereby being able to drive the NaS battery system. A user who can recognize the state of the NaS battery system and drive the NaS battery system is limited to the owner in many cases.

Japanese Patent Application Laid-Open No. 2013-176226 relates to a method of borrowing a free capacity of a rechargeable battery. In the method of borrowing the free capacity of the rechargeable battery, a consumer sets a free capacity and a free period of time of a lendable rechargeable battery and a price for lending. An electrical system operator determines a free capacity and a free period of time to borrow. A consumer side rechargeable battery charges and discharges a compensating amount of charge and discharge in accordance with an instruction from the electrical system operator. The electrical system operator measures a used electrical power amount and pays a price to the consumer.

The NaS battery can discharge large electrical power for a long period of time. Thus, the NaS battery system including the NaS battery potentially has a discharge capacity which can be provided to a plurality of users other than the owner.

However, a scheme of providing the plurality of users other than the owner with the discharge capacity of the NaS battery system is not conventionally provided, thus the discharge capacity which the NaS battery system potentially has is not sufficiently used.

This problem also occurs in a secondary battery system other than the NaS battery system.

SUMMARY

The present invention is directed to a user interface providing device.

The user interface providing device includes an acquisition part, a receiving part, a determination part, and a generation part.

The acquisition part acquires a discharge capacity capable of providing to a whole plurality of users other than a main user in a discharge capacity of a secondary battery system.

The receiving part receives a logon of a user included in the plurality of users.

The determination part determines a usable discharge capacity for the logged-on user from the discharge capacity capable of providing to the whole plurality of users.

The generation part generates information indicating contents of a user interface screen including a screen element indicating the usable discharge capacity for the logged-on user.

The acquisition part, the receiving part, the determination part, and the generation part constituting the user interface providing device may be made up of a plurality of apparatuses. Two or more elements included in the acquisition part, the receiving part, the determination part, and the generation part may be made up of one apparatus. When the acquisition part, the receiving part, the determination part, and the generation part are made up of a plurality of apparatuses, the plurality of apparatuses are disposed in positions physically separated from each other, and communicably connected to each other via a communication line.

The present invention is also directed to a method of providing a discharge capacity of secondary battery system, and a method of providing a charge-discharge capacity of secondary battery system.

Effects of the Invention

According to the present invention, the user who has logged on can recognize the usable discharge capacity in the discharge capacity of the secondary battery system. Accordingly, the scheme of providing the plurality of users other than the main user such as the owner with the discharge capacity of the secondary battery system can be provided.

Therefore, the problem to be solved by present invention is to provide a scheme of providing a plurality of users other than a main user such as an owner with a discharge capacity which a secondary battery system potentially has.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a block diagram schematically illustrating a user interface providing device included in the multiuse system.

FIG. 6 is a graph illustrating examples of a charge-discharge capacity of natrium-sulfur (NaS) battery system, a charge-discharge capacity used by a main user, and a usable charge-discharge capacity for a plurality of users other than the main user in the multiuse system.

DESCRIPTION OF THE PREFERRED EMBODIMENTS

1 Multiuse System

Figure 1:
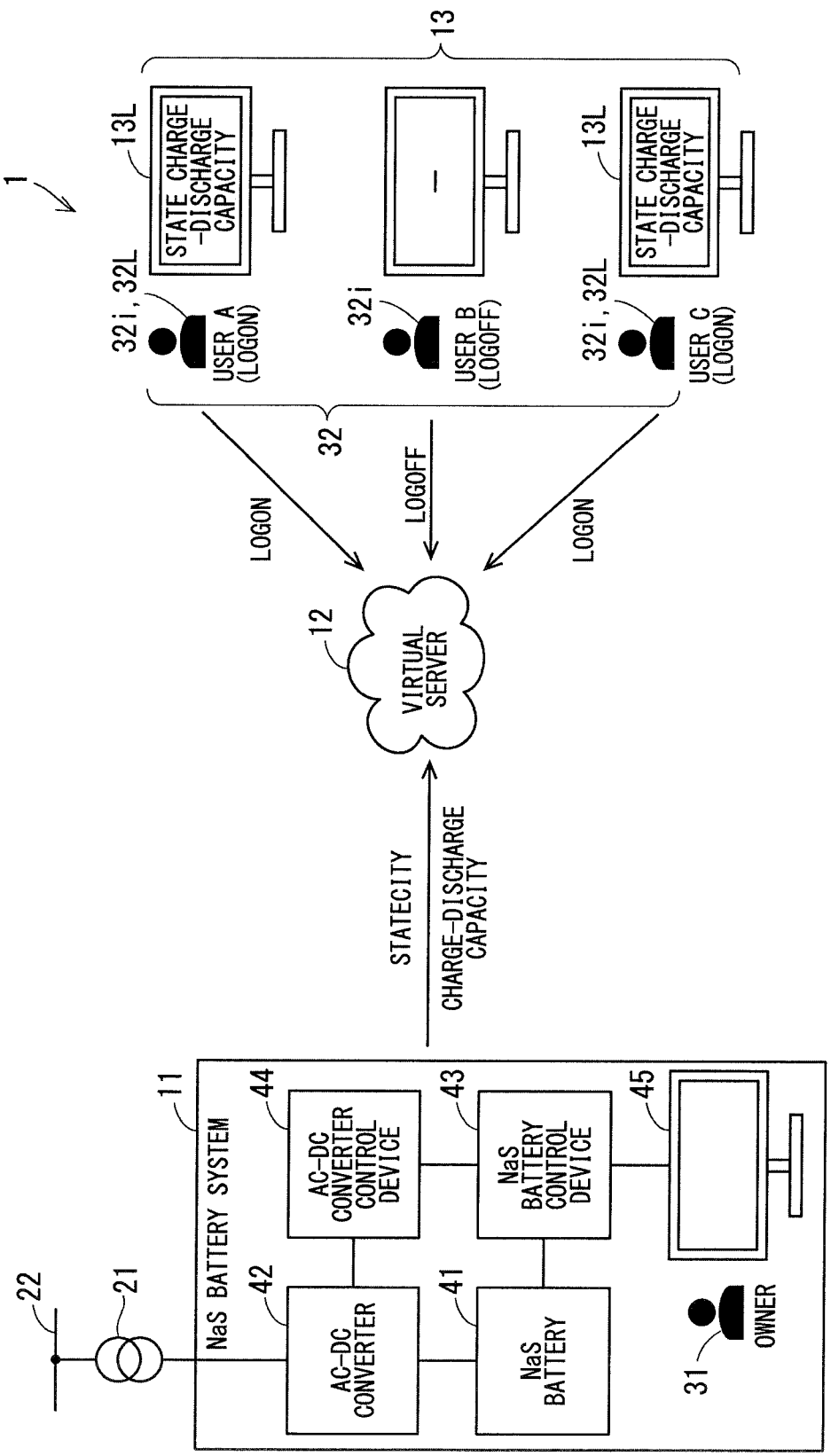
FIG. 1 is a block diagram schematically illustrating a multiuse system.

FIG. 1 is a block diagram schematically illustrating a multiuse system according to an embodiment of the present invention.

A multiuse system 1 according to the embodiment 1 in FIG. 1 includes a natrium-sulfur (NaS) battery system 11, a virtual server 12, and a plurality of clients 13.

The NaS battery system 11 discharges AC power. The discharged AC power is stepped up by a transformer 21. The stepped-up AC power is supplied to a system 22. The AC power supplied from the system 22 is stepped-down by the transformer 21. The NaS battery system 11 is charged by the stepped-down AC power.

The NaS battery system 11 is one NaS battery system delivered in one arrangement position. The NaS battery system 11 may be a plurality of NaS battery systems delivered in a plurality of arrangement positions, respectively.

A main user 31 of the NaS battery system 11 such as an owner thereof can monopolize the charge-discharge capacity of the NaS battery system 11, or can release the charge-discharge capacity of the NaS battery system 11 to a plurality of users 32 other than the main user 31. When the main user 31 monopolizes the charge-discharge capacity of the NaS battery system 11, only the main user 31 can use the charge-discharge capacity of the NaS battery system 11. When the main user 31 releases the charge-discharge capacity of the NaS battery system 11 to the plurality of users 32, at least one user included in the main user 31 and the plurality of users 32 can use the charge-discharge capacity of the NaS battery system 11.

The virtual server 12 acquires, from the NaS battery system 11, the charge-discharge capacity capable of providing to the whole plurality of users 32 in the charge-discharge capacity of the NaS battery system 11. The charge-discharge capacity capable of providing to the whole plurality of users 32 is a charge-discharge capacity obtained by subtracting the charge-discharge capacity used by the main user 31 from the charge-discharge capacity of the NaS battery system 11. The virtual server 12 receives a logon of a user 32L included in the plurality of users 32. The virtual server 12 determines the usable charge-discharge capacity for the logged-on user 32L from the charge-discharge capacity capable of providing to the whole plurality of users 32. The virtual server 12 provides the logged-on user 32L with a user interface screen indicating the usable charge-discharge capacity for the logged-on user 32L.

The plurality of clients 13 can access to the virtual server 12. The plurality of users 32 are able to make the plurality of clients 13 access to the virtual server 12, respectively, and to log on the virtual server 12 via the plurality of clients 13, respectively. Two or more users may log on the virtual server 12 via one client. The user interface screen described above is provided to the logged-on user 32L to the virtual server 12 via a client 13L having access to the virtual server 12.

The virtual server 12 and the plurality of clients 13 are connected to Internet. Thus, the virtual server 12 is a web human machine interface (web HMI) server providing user interface on Internet. An address of the virtual server 12 is open to the plurality of users 32. Accordingly, the plurality of users 32 are able to make the plurality of clients 13 have access to the virtual server 12, respectively. Each user 32i included in the plurality of users 32 is an account user having an account for logging on the virtual server 12. The account of each account user 32i is set by the main user 31, and given from the main user 31 to each user 32i. The main user 31 sets the account given to each account user 23i to a user interface providing device 51 described hereinafter. It is also applicable that the account of each account user 32i is set by an account manager other than the main user 31 and given from the account manager to each account user 32i. The account manager may set the account given to each account user 23i to the user interface providing device 51 described hereinafter.

The virtual server 12 is built in the NaS battery system 11. It is also applicable that the virtual server 12 is not built in the NaS battery system 11 but may be replaced with a physical server communicably connected to the NaS battery system 11. Any connection is applicable as a connection of the physical server to the NaS battery system 11, thus any of wireless connection and wired connection is also applicable. The connection is performed using Internet or a mobile communication network, for example.

2 NaS Battery System

As illustrated in FIG. 1, the NaS battery system 11 includes a NaS battery 41, an AC-DC converter 42, a NaS battery control device 43, an AC-DC converter control device 44, and a terminal 45.

The NaS battery 41 discharges DC power. The AC-DC converter 42 converts the discharged DC power into AC power discharged by the NaS battery system 11. The AC-DC converter 42 converts the AC power for charging the NaS battery system 11 into DC power. The NaS battery 41 is charged by the DC power. The AC-DC converter control device 44 controls the AC-DC converter 42. The NaS battery control device 43 acquires information from the NaS battery 41 and the AC-DC converter control device 44, controls the NaS battery 41, and transmits an instruction to the AC-DC converter 42 via the AC-DC converter control device 44. The NaS battery control device 43 calculates the charge-discharge capacity of the NaS battery system 11 and a state of the NaS battery system 11 other than the charge-discharge capacity from the acquired information, the control which has been performed, and the transmitted instruction, for example. The terminal 45 receives an input of a plurality of priorities given to the plurality of users 32, respectively. The plurality of priorities are inputted by the main user 31. The plurality of priorities may be inputted by an account manager other than the main user 31. The NaS battery control device 43 acquires the inputted plurality of priorities, and calculates the charge-discharge capacity capable of providing to the whole plurality of users 32 in the charge-discharge capacity of the NaS battery system 11 and the usable charge-discharge capacity for each account user 32i based on the acquired plurality of priorities.

The virtual server 12 is installed in the terminal 45. A function of the virtual server 12 may be mounted on the NaS battery control device 43. The function of the virtual server 12 may be provided by a cloud system.

The NaS battery system 11 having a configuration illustrated in FIG. 1 may be replaced with a NaS battery system having a configuration different from that illustrated in FIG. 1.

The NaS battery 41 is an example of a secondary battery, and the NaS battery system 11 including the NaS battery 41 is an example of a secondary battery system including the secondary battery. Thus, the NaS battery system 11 including the NaS battery 41 may be replaced with a secondary battery system including a secondary battery other than the NaS battery 41. The secondary battery other than the NaS battery 41 is a redox flow battery, a lithium battery, a nickel hydride battery, and a lead storage battery, for example. The NaS battery 41 has advantages that it has a large battery capacity, and can charge and discharge the battery for a long period of time, thus a future forecast of the battery capacity can be easily performed.

The virtual server 12, the NaS battery control device 43, and the terminal 45 may be made up of one apparatus or a plurality of apparatuses. When the virtual server 12, the NaS battery control device 43, and the terminal 45 are made up of the plurality of apparatuses, each of the virtual server 12, the NaS battery control device 43, and the terminal 45 may be made up of one apparatus, or two elements selected from the virtual server 12, the NaS battery control device 43, and the terminal 45 may be made up of one apparatus.

3 User Interface Providing Device and User Interface Screen

Figure 3:
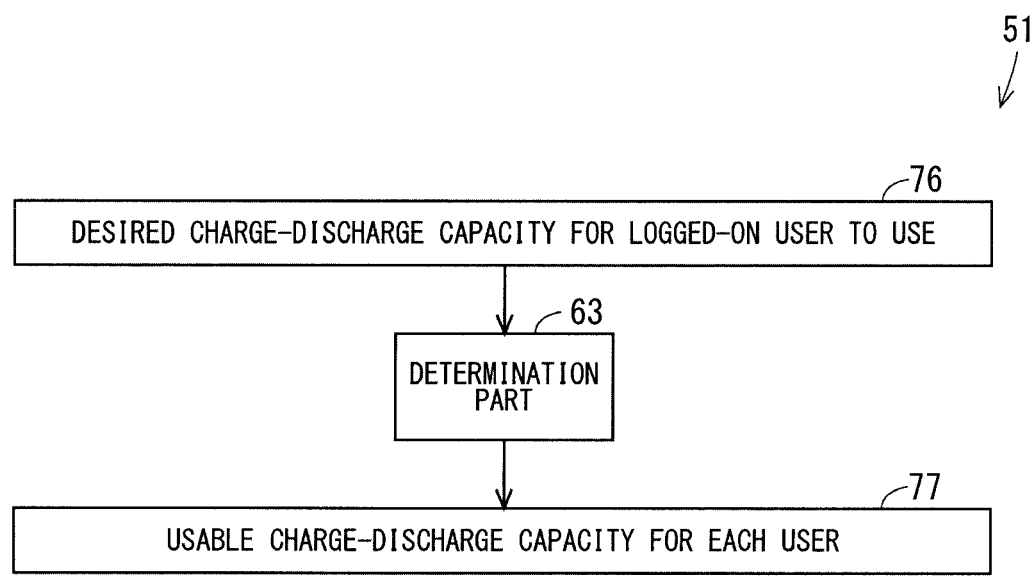
FIG. 3 is a block diagram schematically illustrating a user interface providing device included in the multiuse system.

FIG. 2 and FIG. 3 are block diagrams each schematically illustrating a user interface providing device included in the multiuse system.

The user interface providing device 51 illustrated in FIG. 2 and FIG. 3 is made up of the virtual server 12 and the NaS battery control device 43.

The user interface providing device 51 includes an acquisition part 61, a receiving part 62, a determination part 63, and a generation part 64. These elements may be made up of a computer executing a program, or may also be made up of hardware.

The user interface providing device 51 handles a charge-discharge capacity 71 of the NaS battery system 11, a charge-discharge capacity 72 capable of providing to the whole plurality of users 32, a usable charge-discharge capacity 73 for the logged-on user 32L, a state 74 of the NaS battery system 11, a plurality of priorities 75 provided to the plurality of users 32, respectively, a charge-discharge capacity 76 desired by the logged-on user 32L to use, a usable charge-discharge capacity 77 for each account user 32i, and information (interface screen information) 78 indicating contents of a user interface screen. Each of the charge-discharge capacities 72, 73, 76, and 77 includes a charge capacity and a discharge capacity. Only discharge capacity may be handled in place of the charge-discharge capacities 72, 73, 76, and 77, respectively.

Figure 4:
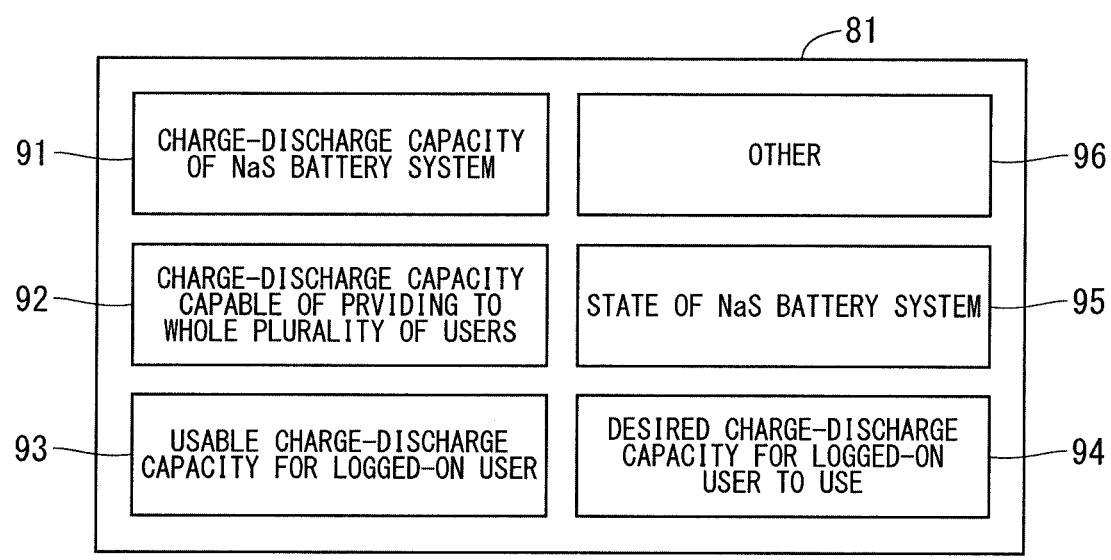
FIG. 4 is a diagram schematically illustrating a user interface screen provided in the multiuse system.

FIG. 4 is a diagram schematically illustrating a user interface screen provided in the multiuse system.

A user interface screen 81 illustrated in FIG. 4 is provided by the user interface providing device 51 illustrated in FIG. 2 and FIG. 3.

The user interface screen 81 includes a screen element 91 indicating the charge-discharge capacity 71 of the NaS battery system 11, a screen element 92 indicating the charge-discharge capacity 72 capable of providing to the whole plurality of users 32, a screen element 93 indicating the usable charge-discharge capacity 73 for the logged-on user 32L, a screen element 94 receiving an input of the charge-discharge capacity 76 desired by the logged-on user 32L to use, a screen element 95 indicating a state of the NaS battery system 11, and the other screen element 96. The screen element 91 and the screen element 92 may be included in the user interface screen 81 only when the user 32L who has logged on is the main user 31.

4 Display of Usable Charge-Discharge Capacity for Logged-on User

The acquisition part 61 acquires, from the NaS battery control device 43, the charge-discharge capacity 72 capable of providing to the whole plurality of users 32 in the charge-discharge capacity 71 of the NaS battery system 11.

The charge-discharge capacity 72 capable of providing to the whole plurality of users 32 includes a charge-discharge capacity forecasted to be capable of providing to the whole plurality of users 32 in each period of time included in a plurality of future periods of time. The forecast of the charge-discharge capacity includes a forecast of charge-discharge electrical power and/or charge-discharge electrical power amount.

The receiving part 62 receives a logon of the user 32L included in the plurality of users 32.

The determination part 63 determines the usable charge-discharge capacity 73 for the logged-on user 32L from the charge-discharge capacity 72 capable of providing to the whole plurality of users 32, acquired by the acquisition part 61.

The usable charge-discharge capacity 73 for the logged-on user 32L is a charge-discharge capacity specific to the logged-on user 32L changing in accordance with the logged-on user 32L.

The usable charge-discharge capacity 73 for the logged-on user 32L includes a charge-discharge capacity forecasted to be usable for the logged-on user 32L in each period of time included in a plurality of future periods of time. The forecast of the usable charge-discharge capacity includes a forecast of charge-discharge electrical power and/or charge-discharge electrical power amount.

The generation part 64 generates, as the interface screen information 78, the information to indicate the screen element 93 indicating the usable charge-discharge capacity 73 for the logged-on user 32L.

The user interface screen 81 is a user interface screen specific to the logged-on user 32L changing in accordance with the logged-on user 32L.

The interface screen information 78 includes a hypertext markup language (HTML) document, for example. The generation part 64 transmits the interface screen information 78 to the client 13L. The client 13L renders the interface screen information 78, and displays the user interface screen 81 including the contents indicated by the information 78.

Accordingly, the logged-on user 32L can recognize the usable charge-discharge capacity 73 in the charge-discharge capacity 71 of the NaS battery system 11. Thus, with the multiuse system according to the present embodiment, it becomes possible to provide the scheme of providing the plurality of users 32 other than the main user 31 with the charge-discharge capacity 71 of the NaS battery system 11. For instance, it becomes possible to use the NaS battery system 11 for a visual power plant (VPP) or an adjusting power project, for example.

5 Priority

The acquisition part 61 acquires the plurality of priorities 75 given to the plurality of users 32, respectively, from the terminal 45. The plurality of priorities 75 given to the plurality of users 32, respectively, are determined by consultations between the main user 31 and the plurality of users 32. An account manager other than the main user 31 may have a role in the determination of the plurality of priorities 75.

The determination part 63 selects the priority given to the logged-on user 32L from the plurality of priorities 75 given to the plurality of users 32, respectively. The determination part 63 determines the usable charge-discharge capacity 73 for the logged-on user 32L so that the logged-on user 32L having higher priority can preferentially use the charge-discharge capacity 71 of the NaS battery system 11.

For example, in a case where the priority given to a first user is higher than that given to a second user, if the charge-discharge capacity desired by the first user to use and the charge-discharge capacity desired by the second user to use compete against each other, the usable charge-discharge capacity for the first user is determined so that the charge-discharge capacity desired by the first user to use can be used by the first user.

1.6 Input of Charge-Discharge Capacity which User Desires to Use

The generation part 64 also generates, as the interface screen information 78, the information to indicate the screen element 94 receiving the input of the charge-discharge capacity 76 desired by the logged-on user 32L to use.

The determination part 63 determines the usable charge-discharge capacity 73 for each user 32i from the charge-discharge capacity 72 capable of providing to the whole plurality of users 32. When the input of the charge-discharge capacity 76 desired by the logged-on user 32L to use is received, the determination part 63 updates the usable charge-discharge capacity 77 for each account user 32i, to reflect the charge-discharge capacity 76 desired by the logged-on user 32L to use on the usable charge-discharge capacity 77 for each account user 32i.

The charge-discharge capacity 76 desired by the logged-on user 32L to use includes a charge-discharge capacity desired by the logged-on user 32L to use in a future period of time. The charge-discharge capacity includes a charge-discharge electrical power and/or a charge-discharge electrical power amount.

7 Display of Charge-Discharge Capacity of NaS Battery System

The acquisition part 61 acquires the charge-discharge capacity 71 of the NaS battery system 11 from the terminal 45.

The charge-discharge capacity 71 of the NaS battery system 11 includes a forecasted charge-discharge capacity of the NaS battery system 11 in each period of time included in a plurality of future periods of time. The forecast of the charge-discharge capacity includes a forecast of charge-discharge electrical power and/or charge-discharge electrical power amount.

The generation part 64 also generates, as the screen interface information 78, the information to indicate the screen element 91 indicating the charge-discharge capacity 71 of the NaS battery system 11, acquired by the acquisition part 61.

8 Display of Charge-Discharge Capacity Capable of Providing to the Whole Plurality of Users The acquisition part 61 acquires, from the terminal 45, the charge-discharge capacity 72 capable of providing to the whole plurality of users 32 as described above.

The generation part 64 also generates, as the screen information 78, the information to indicate the screen element 92 indicating the charge-discharge capacity 72 capable of providing to the whole plurality of users 32.

9 Display of State of NaS Battery System

The acquisition part 61 acquires a state 74 of the NaS battery system 11 other than the charge-discharge capacity 71.

The state 74 of the NaS battery system 11 includes presence or absence of failure in the NaS battery system 11 and a current charge-discharge electrical power of the NaS battery system 11, for example.

The generation part 64 also generates, as the information 78, the information to indicate the screen element 95 indicating the state 74 of the NaS battery system 11.

10 Other Screen Element

The generation part 64 also generates, as the information 78, the information to indicate the other screen element 96 than the screen elements 91, 92, 93, 94, and 95 described above.

11 Authority of Main User

The main user 31 has an authority of limiting an authority of each user 32i using the charge-discharge capacity 71 of the NaS battery system 11 at will. Thus, the main user 31 can change an account and a priority given to each user 32i at an optional timing and terminate an account given to each user 32i at an optional timing. The main user 31 can change the usable charge-discharge capacity 77 for each account user 32i and the screen elements 91, 92, 93, 94, 95, and 96 included in the user interface screen 81 at an optional timing. Change of the charge-discharge capacity 77 includes change of a period of time in which the charge and discharge can be performed and change of the charge-discharge electrical power and/or charge-discharge electrical power amount in a period of time in which the charge and discharge can be performed. Change of the screen elements 91, 92, 93, 94, 95, and 96 includes limitation of the contents of the information indicated by the screen elements 91, 92, 93, 94, 95, and 96.

12 Example of User Interface Screen

Figure 5:
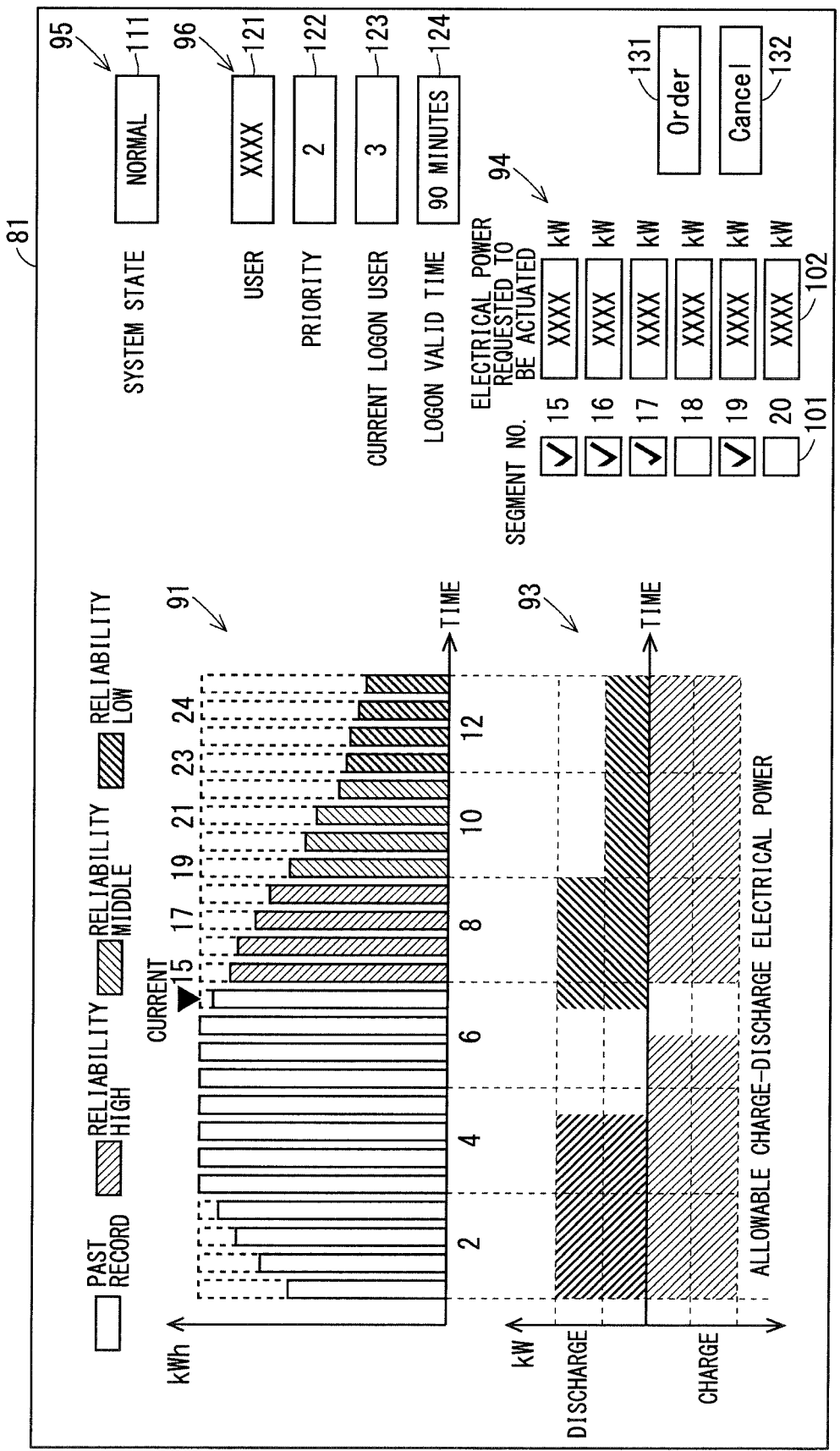
FIG. 5 is a diagram schematically illustrating an example of the user interface screen provided in the multiuse system.

FIG. 5 is a diagram schematically illustrating a user interface screen provided in the multiuse system.

The user interface screen 81 illustrated in FIG. 5 includes the screen element 91 indicating the charge-discharge capacity 71 of the NaS battery system 11, the screen element 93 indicating the usable charge-discharge capacity 73 for the logged-on user 32L, the screen element 94 receiving the input of the charge-discharge capacity 76 desired by the logged-on user 32L to use, the screen element 95 indicating the state of the NaS battery system 11, and the other screen element 96.

The screen element 91 indicating the charge-discharge capacity 71 of the NaS battery system 11 includes a graph. The graph includes a forecast of the charge-discharge electrical power amount in which the NaS battery system 11 can charge and discharge the power in each period of time included in a plurality of future periods of time, a past record of the charge-discharge electrical power amount in which the NaS battery system 11 could charge and discharge the power in each period of time included in a plurality of past periods of time, and a past record of the charge-discharge electrical power amount in which the NaS battery system 11 can charge and discharge the power in a current period of time. The graph is drawn so that reliability of the forecast can be understood by a difference of a display state of a color, for example.

The screen element 93 indicating the usable charge-discharge capacity 73 for the logged-on user 32L includes a graph. The graph includes a forecast of the usable charge/discharge capacity for the logged-on user 32L in each period of time included in a plurality of future periods of time, a past record of the usable charge/discharge capacity for the logged-on user 32L in each period of time included in a plurality of past periods of time, and a past record of the usable charge/discharge electrical power for the logged-on user 32L in a current period of time.

Each period of time has a length of thirty minutes. A segment number for identifying each period of time is given to each period of time. Each period of time may have any length longer than thirty minutes or any length shorter than thirty minutes.

The screen element 94 receiving the input of the desired charge/discharge capacity 76 for the logged-on user 32L to use includes a graphical user interface (GUI) component 101 receiving an input whether or not the logged-on user 32L uses the charge/discharge capacity in each period of time for each period of time included in a plurality of periods of time and a GUI component 102 receiving an input of the desired charge-discharge electrical power for the logged-on user 32L to use in each period of time, for example.

The screen element 95 indicating the state of the NaS battery system 11 includes a display region 111 displaying presence or absence of failure in the NaS battery system 11, for example.

The screen element 96 includes the display region 121 displaying the information for specifying the logged-on user 32L, a display region 122 displaying information indicating a priority given to the logged-on user 32L, a display region 123 displaying information indicating the number of logged-on users, and a display region 124 displaying information indicating a time for which the logged-on user 32L can maintain a logon state.

The other screen element 96 includes an order button 131 and a cancel button 132, for example. When the order button 131 is operated, an instruction of requesting the charge and discharge at the charge-discharge electrical power corresponding to the input received by the GUI component 102 at the period of time corresponding to the input received by the GUI component 101 is transmitted to the NaS battery control device 43 via the virtual server 12. When the cancel button 132 is operated, an instruction of requesting cancelling of the charge and discharge at the charge-discharge electrical power corresponding to the input received by the GUI component 102 at the period of time corresponding to the input received by the GUI component 101 is transmitted to the NaS battery control device 43 via the virtual server 12. Contents of these instructions are reflected on a graph included in the screen element 91, a graph included in the screen element 93, and a graph illustrated in FIG. 6 described hereinafter.

13 Example of Charge-Discharge Capacity of NaS Battery System, Charge-Discharge Capacity Set to be Used by Main User, and Charge-Discharge Capacity Set to be Used by Plurality of Users FIG. 6 is a graph indicating an example of a charge-discharge capacity of NaS battery system, a charge-discharge capacity set to be used by a main user, and a charge-discharge capacity set to be used by a plurality of users other than the main user in the multiuse system.

FIG. 6 illustrates that a sum of the charge/discharge capacity set to be used by the main user 31 and the charge/discharge capacity set to be used by the plurality of users 32 such as "USER A" and "USER C" is equal to or smaller than the charge/discharge capacity of the NaS battery system 11 illustrated by a broken line and the charge/discharge capacity set to be used by the plurality of users 32 is obtained by subtracting the charge/discharge capacity set to be used by the main user 31 from the charge/discharge capacity of the NaS battery system 11.

The present invention has been shown and described in detail, the foregoing description is in all aspects illustrative and not restrictive. It is therefore understood that numerous modifications and variations can be devised without departing from the scope of the invention.

What is claimed is:

1. A user interface providing device, comprising:
    an acquisition part acquiring a charge-discharge capacity capable of providing to a whole of a plurality of users other than a main user in a charge-discharge capacity of a secondary battery system;
    a receiving part receiving a logon of a user included in the plurality of users other than the main user;
    a determination part determining a usable charge-discharge capacity for a logged-on user, who has been received the logon by the receiving part, from the charge-discharge capacity capable of providing to the whole of the plurality of users; and
    a generation part generating information indicating contents of a user interface screen including a screen element indicating the usable charge-discharge capacity for the logged-on user;
    wherein the acquisition part acquires a plurality of priorities given to the plurality of users, respectively,
    the determination part determines the usable charge-discharge capacity for the logged-on user so that the logged-on user having higher priority can preferentially use the charge-discharge capacity of the secondary battery system; and
    the secondary battery system includes a natrium-sulfur battery system including a natrium-sulfur battery.

2. The user interface providing device according to claim 1, wherein
    the user interface screen includes a screen element receiving an input of a desired charge-discharge capacity for the logged-on user to use,
    the determination part determines a usable charge-discharge capacity for each account user included in the plurality of users from the charge-discharge capacity capable of providing to the whole of the plurality of users; and
    when the input is received, the determination part updates the usable charge-discharge capacity for each the account user, to reflect the desired charge-discharge capacity for the logged-on user to use on the usable charge-discharge capacity for each the account user.

3. The user interface providing device according to claim 1, wherein
    the user interface screen includes a screen element indicating the charge-discharge capacity capable of providing to the whole of the plurality of users.

4. The user interface providing device according to claim 1, wherein
    the usable charge-discharge capacity for the logged-on user includes a usable charge-discharge capacity forecasted to be usable for the logged-on user in each period of time included in a plurality of future periods of time.

5. The user interface providing device according to claim 1, wherein
    the acquisition part acquires the charge-discharge capacity of the secondary battery system, and
    the user interface screen includes a screen element indicating the charge-discharge capacity of the secondary battery system.

6. The user interface providing device according to claim 1, wherein
    the acquisition part acquires a state of the secondary battery system other than the charge-discharge capacity of the secondary battery system, and
    the user interface screen includes a screen element indicating the state of the secondary battery system.

7. A method of providing a charge-discharge capacity of a secondary battery system, comprising steps of:
    inputting the charge-discharge capacity capable of providing to the whole of the plurality of users to a user interface providing device; and
    setting an account of a user, who can execute the logon, to the user interface providing device,
    the user interface providing device, comprising:
    an acquisition part acquiring a charge-discharge capacity capable of providing to a whole of a plurality of users other than a main user in a charge-discharge capacity of a secondary battery system;
    a receiving part receiving a logon of a user included in the plurality of users other than the main user;
    a determination part determining a usable charge-discharge capacity for a logged-on user, who has been received the logon by the receiving part, from the charge-discharge capacity capable of providing to the whole of the plurality of users; and a generation part generating information indicating contents of a user interface screen including a screen element indicating the usable charge-discharge capacity for the logged-on user,
wherein the acquisition part acquires a plurality of priorities given to the plurality oi users, respectively,
the determination part determines the usable large-discharge capacity for the logged-on user so that the logged-on user laving higher priority can preferentially use the charge-discharge capacity of the secondary battery system; and
the secondary battery system includes a natrium-sulfur battery system including a natrium-sulfur battery.

\* \* \* \* \*